(12) United States Patent
Jayanthi et al.

(10) Patent No.: US 10,621,798 B2
(45) Date of Patent: Apr. 14, 2020

(54) VEHICLE INSTALLED MOBILE DEVICE AND SERVER FOR TASK ASSIGNMENTS AND COLLABORATION

(71) Applicants: Madhavi Jayanthi, Laguna Niguel, CA (US); Bindu Rama Rao, Laguna Niguel, CA (US)

(72) Inventors: Madhavi Jayanthi, Laguna Niguel, CA (US); Bindu Rama Rao, Laguna Niguel, CA (US)

(*) Notice: Subject to any disclaimer, the term of this patent is extended or adjusted under 35 U.S.C. 154(b) by 182 days.

(21) Appl. No.: 15/841,293

(22) Filed: Dec. 14, 2017

(65) Prior Publication Data

US 2018/0122162 A1 May 3, 2018

Related U.S. Application Data

(63) Continuation-in-part of application No. 15/250,926, filed on Aug. 30, 2016, now Pat. No. 9,865,099, which is a continuation of application No. 14/488,184, filed on Sep. 16, 2014, now Pat. No. 9,483,883, which is a continuation-in-part of application No. 14/136,655, filed on Dec. 20, 2013, now Pat. No. 9,243,912, which is a continuation of application No. 12/070,268, filed on Feb. 15, 2008, now Pat. No. 8,700,310, which is a (Continued)

(51) Int. Cl.
| | |
|---|---|
| G07C 5/00 | (2006.01) |
| H04W 4/02 | (2018.01) |
| G01C 21/34 | (2006.01) |
| H04W 4/024 | (2018.01) |
| H04W 4/029 | (2018.01) |
| H04L 29/08 | (2006.01) |
| G01C 21/36 | (2006.01) |
| H04W 4/40 | (2018.01) |
| G06Q 10/06 | (2012.01) |
| G06Q 50/28 | (2012.01) |
| G06Q 10/02 | (2012.01) |

(52) U.S. Cl.
CPC ........... *G07C 5/008* (2013.01); *G01C 21/343* (2013.01); *G01C 21/3682* (2013.01); *G06Q 10/025* (2013.01); *G06Q 10/063118* (2013.01); *G06Q 50/28* (2013.01); *H04L 67/22* (2013.01); *H04L 67/26* (2013.01); *H04L 67/306* (2013.01); *H04W 4/023* (2013.01); *H04W 4/024* (2018.02); *H04W 4/029* (2018.02); *H04W 4/40* (2018.02)

(58) Field of Classification Search
CPC ...... G07C 5/008; H04W 4/024; H04W 4/029; G01C 21/343
USPC ....................... 701/206, 32.4, 400
See application file for complete search history.

(56) References Cited

U.S. PATENT DOCUMENTS

| | | | | |
|---|---|---|---|---|
| 6,484,033 B2* | 11/2002 | Murray | ............... | H04M 3/432 455/456.3 |
| 6,731,238 B2* | 5/2004 | Johnson | ............... | H04W 4/029 342/357.48 |

(Continued)

*Primary Examiner* — Thomas G Black
*Assistant Examiner* — Wae L Louie

(57) ABSTRACT

Mobile device installed in a vehicle for communicating a current location and a current destination, to a coordination server, receives a set of tasks (statically assigned or dynamically assigned) for the user/driver, with automatic collaboration initiated with a second driver for task completion, and facilitating VR based user training, as required.

20 Claims, 4 Drawing Sheets

Related U.S. Application Data continuation-in-part of application No. 12/012,859, filed on Feb. 5, 2008, now Pat. No. 8,588,814.

(56) References Cited

U.S. PATENT DOCUMENTS

| | | | | |
|---|---|---|---|---|
| 6,861,980 B1* | 3/2005 | Rowitch | ............... | G01S 19/05 342/357.31 |
| 6,970,871 B1* | 11/2005 | Rayburn | ............... | G06Q 30/02 |
| 7,084,758 B1* | 8/2006 | Cole | ............... | G06Q 10/109 340/309.16 |
| 7,246,009 B2* | 7/2007 | Hamblen | ............... | G07C 5/085 340/988 |
| 7,272,493 B1* | 9/2007 | Hamrick | ............... | H04W 4/029 701/517 |
| 7,475,057 B1* | 1/2009 | Obradovich | ........ | G06F 16/9535 707/999.01 |
| 7,522,995 B2* | 4/2009 | Nortrup | ............... | G01C 21/3407 701/425 |
| 7,577,525 B2* | 8/2009 | Hamrick | ............... | H04W 4/029 701/482 |
| 7,627,334 B2* | 12/2009 | Cohen | ............... | G06Q 30/02 455/456.3 |
| 7,649,454 B2* | 1/2010 | Singh | ............... | G06Q 10/109 340/539.11 |
| 7,672,664 B2* | 3/2010 | Silverbrook | ............ | H04M 1/21 270/52.02 |
| 7,716,298 B2* | 5/2010 | Boss | ............... | G06Q 10/107 709/206 |
| 7,783,590 B2* | 8/2010 | Fukazawa | ............... | G06Q 10/10 705/7.13 |
| 7,818,317 B1* | 10/2010 | Emigh | ............... | H04L 67/18 707/724 |
| 7,941,133 B2* | 5/2011 | Aaron | ............... | G06Q 10/109 455/418 |
| 8,588,814 B2* | 11/2013 | Jayanthi | ............. | G01C 21/3438 455/456.2 |
| 8,700,310 B2* | 4/2014 | Jayanthi | ............... | G01C 21/26 701/408 |
| 8,793,065 B2* | 7/2014 | Seltzer | ............... | G01C 21/28 340/995.14 |
| 2004/0131014 A1* | 7/2004 | Thompson, III | ....... | H04H 60/06 370/230 |
| 2005/0227712 A1* | 10/2005 | Estevez | ............... | G06Q 10/109 455/456.3 |
| 2007/0270159 A1* | 11/2007 | Lohtia | ............... | H04L 12/189 455/456.1 |
| 2008/0171555 A1* | 7/2008 | Oh | ............... | G01C 21/20 455/456.1 |
| 2009/0210148 A1* | 8/2009 | Jayanthi | ............... | G01C 21/26 701/467 |
| 2014/0229426 A1* | 8/2014 | Gootee, III | ......... | G06F 17/5004 707/608 |
| 2015/0179000 A1* | 6/2015 | Jayanthi | ............... | G01C 21/26 701/32.4 |
| 2016/0188720 A1* | 6/2016 | Schlesinger | .......... | G06F 16/951 707/709 |
| 2016/0371895 A1* | 12/2016 | Jayanthi | ............... | H04W 4/023 |
| 2017/0116552 A1* | 4/2017 | Deodhar | ........... | G06Q 10/06316 |
| 2017/0215071 A1* | 7/2017 | Jayanthi | ............... | H04W 12/06 |
| 2018/0048674 A1* | 2/2018 | Black | ............... | H04L 63/18 |
| 2018/0122162 A1* | 5/2018 | Jayanthi | ............... | H04L 67/22 |
| 2019/0035171 A1* | 1/2019 | Jayanthi | ............... | G06Q 10/025 |

* cited by examiner

VEHICLE INSTALLED MOBILE DEVICE AND SERVER FOR TASK ASSIGNMENTS AND COLLABORATION

CROSS REFERENCES TO RELATED APPLICATIONS

The present patent application is a continuation-in-part of, claims priority to, and makes reference to U.S. non-provisional patent Ser. No. 15/250,926, entitled "VEHICLE INSTALLED MOBILE DEVICE AND SERVER FOR GPS SERVICES AND TASK ASSIGNMENTS", filed 30 Aug. 2016, which in turn is a continuation of, claims priority to, and makes reference to U.S. Pat. No. 9,483,883, Ser. No. 14/488,184, entitled "VEHICLE INSTALLED MOBILE DEVICE AND SERVER FOR GPS SERVICES BASED ADHOC TASK ASSIGNMENTS", filed Sep. 16, 2014, which in turn is a continuation-in-parts (CIP) of, claims priority to, and makes reference to U.S. non-provisional patent Ser. No. 14/136,655, titled "MOBILE DEVICE AND SERVER FOR GPS SERVICES BASED TASK ASSIGNMENT", which in turn is a continuation of, claims priority to, and makes reference to U.S. non-provisional patent Ser. No. 12/070,268, entitled "MOBILE DEVICE AND SERVER FOR FACILITATING GPS BASED SERVICES", filed Feb. 15, 2008, which in turn is a continuation-in-part of, claims priority to, and makes reference to U.S. non-provisional patent Ser. No. 12/012,859, patented as U.S. Pat. No. 8,588,814, entitled "CLIENT IN MOBILE DEVICE FOR SENDING AND RECEIVING NAVIGATIONAL COORDINATES AND NOTIFICATIONS", filed on Feb. 5, 2008. The complete subject matter of all the above-referenced United States patent applications is hereby incorporated herein by reference, in their respective entirety.

BACKGROUND

1. Technical Field

The present invention relates generally to a mobile device and particularly to a solution wherein GPS based services are facilitated.

2. Related Art

Mobile devices are becoming ubiquitous. Children carry them and so do adults. Children use them to ask their parents to come pick them up at a mall or a park. Often parents spend a lot of time trying to locate their child at a mall when they get a call for a ride. Similarly, children wait for a long time outside a mall waiting for their parents to arrive, often in inclement weather. This problem is also faced by mobile users who travel to a new country on business and pleasure and wait for a taxi pickup at an airport, outside an airport or in train stations.

Quite often, a user has a mobile phone with a GPS and may desire to go to a store. The user has to type in an address to activate the GPS based navigational facilities. The address could be long and comprise of more than 50 characters quite often, making the user struggle with the painfully small and cramped keyboard on the mobile device. Quite often the keyboards on a mobile device has 3 letters of the alphabet mapped into a single key that makes data entry very complicated and tiring.

Often a user has a mobile phone and drives around town. Unfortunately, the various places the user visits is not known to the user's family or his colleagues at work. If the user's wife had wanted him to buy some stamps when the user was at the post office, she does not have any way to find out if the user visited or went by a post office while driving around town. And the user has no way to automatically determine if his wife needs him to buy something either.

Quite often a manager is a business assigns tasks to his subordinates to get some work done. However, task assignment, such as assigning homes for a sales person to visit on a given day, is usually a priori. If a new task comes up that must be assigned right away, there is no easy way to determine which of the subordinates is the right person to whom the task should be assigned. Such determination may take several phone calls and timely responses from the recipients of those phone calls.

Often a person has a list of tasks prepared on a notepad at home and forgets to bring it with him while driving his vehicle. Thus the tasks do not get done in time. A different person from the household could also be driving around in another vehicle but there is no easy way to inform that person on those tasks to be performed, which of the tasks have been partially performed, etc.

Quite often, several drivers drive their vehicles on same route, often with no knowledge of the others also driving on the same route at the same time. Thus collaboration between these drivers is not possible.

GPS satellites have been used for a while for navigation. GPS satellites do not actually pinpoint your location as is commonly believed. The 24 satellites circling the earth each contain a precise clock that transmits a signal comprising a time to the GPS receiver in a user's mobile device. The mobile device processes the satellite signals to determine geometrically where the user is located.

Quite often, GPS based components are used in cell phones, and in some vehicles. However, there are very few applications that are available that make use of these devices for anything other than simple navigation from point A to point B. Some location based services have been created that provide a user with sales coupons based on the location determined for a user. But there are few meaningful applications that exist that try to make a user's work efficient. There are no applications/solutions that try to optimize task assignment, and try to make further use of GPS technologies to dynamically assign work, opportunistically reschedule work, etc.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an elegant means of interaction between people wherein the location information from a first user's mobile device is communicated to a second user's mobile device, and to a plurality of other mobile devices, as necessary. The recipients of the location information can act upon it. For example, using the communicated location information, the second user's mobile device guides the second user to the current location of the first user. In addition, the user of the first mobile device can be the recipient for location information communicated by several other users (for example, communicated by other mobile devices). Also, the recipients of the location information can send a task list to the first user's mobile device requesting the first user to complete those tasks.

The present invention facilitates communicating, from a mobile device, arrival information at a waypoint, communicating that information to a server, receiving a set of tasks (statically assigned or dynamically assigned) for the user (for example, from the server or from another user), displaying the set of tasks to the user, receiving a completion response (successful or unsuccessful) from the user, and proceeding to the next waypoint along a route/trip plan.

The present invention makes it possible to map a phone number (of a business or residence, for example) into a corresponding GPS coordinates (such as longitude and latitude). It also makes it possible to dynamically retrieve such mapping information from mobile devices, if necessary, with optional user consent.

Figure 1:
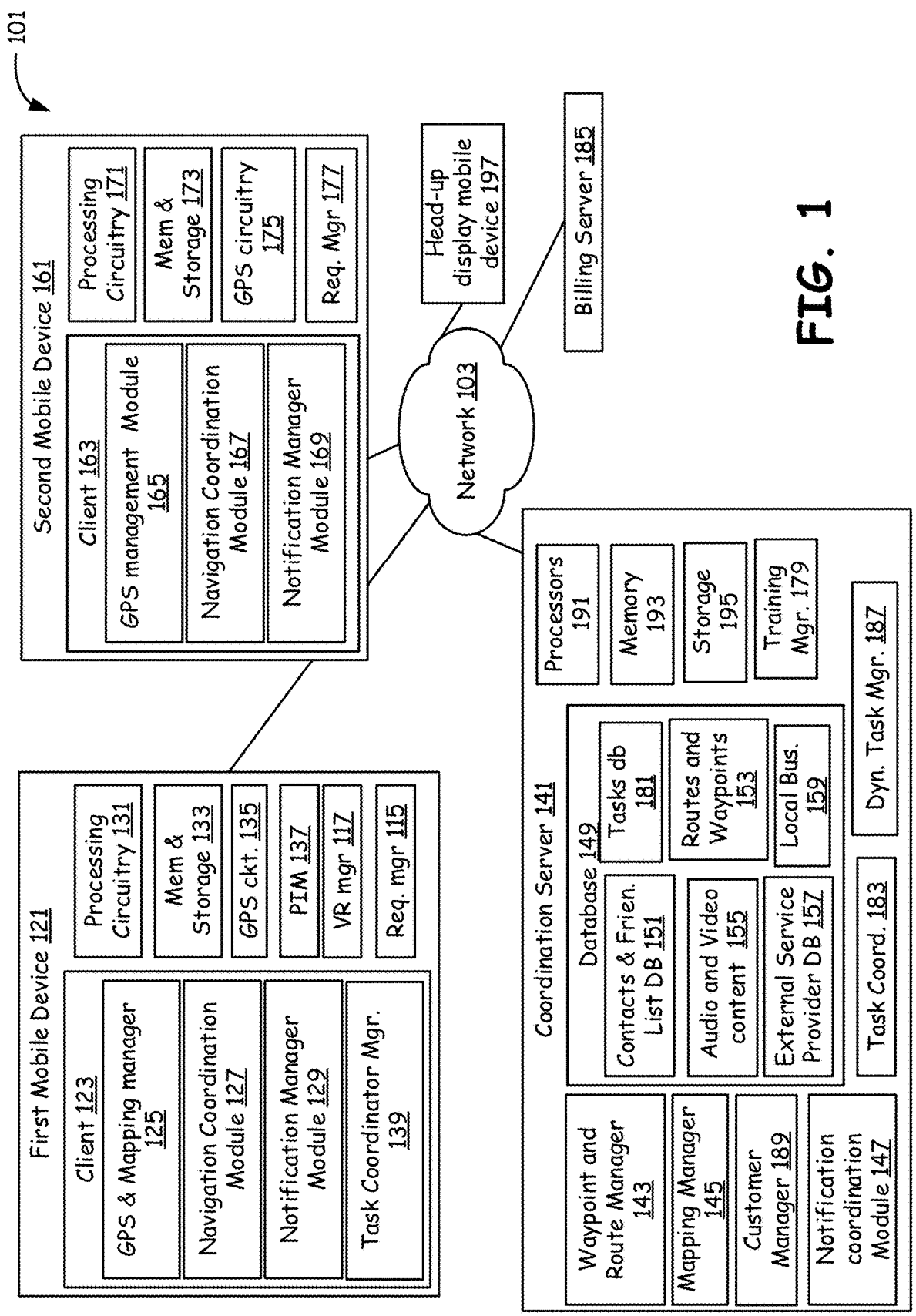
FIG. 1 is a perspective block diagram of a mobile web system wherein a first mobile device with a client software, used by a first user, facilitates sending a location information to a coordination server or to a second mobile device, and receiving as response a set of tasks assigned to the first user that are to be completed by the first user after the first user reaches a specific (pre-specified or dynamically specified) location or landmark.

FIG. 1 is a perspective block diagram of a mobile web system 101 wherein a first mobile device 121 with a client software 123, used by a first user, facilitates sending a location information to a coordination server 141 or to a second mobile device 161, and receiving as response a set of tasks assigned to the first user that are to be completed by the first user after the first user reaches a specific (pre-specified or dynamically specified) location or landmark. The coordination server 141 or a client software 163 in the second mobile device 161 communicates a set of tasks assigned to the first user for completion by the first user at specified locations. For example, a second user specifies what those tasks are that are to be completed by the first user when the first user reaches (arrives at) a desired location. In addition, based on the location information received from the first mobile device 121, the second user, employing the client software 163, communicates the set of tasks that the first user must complete.

In one embodiment, the client software 123 sends a notification to the coordination server 141 along with a current location and a current destination. Then the client software 123 dynamically accepts and presents a task list it receives in response to the notification. The task list comprises a plurality of tasks sent from the coordination server 141 in response to receipt of the notification, and is saved in a database 149. The task list is opportunistically provided by the coordination server 141 to take advantage of an opportunity to get tasks executed by a corresponding user, the selection of the task list being based on a current pool of dynamically assembled tasks, the current location and the current destination. The use of other mobile device 121 related attributes or a user related attributes/parameters, and the use of a user profile, in the selection of tasks for the task list are also contemplated. The present invention employs the client software 123 and a dynamic task manager 187 in the coordination server 141 to dynamically assign work, opportunistically reschedule work to users, etc.

In one embodiment, the mobile device used by the user inside a vehicle is a head-up display mobile device 197 that accepts user's input in the form of gestures, touches, and voice commands. The head-up display mobile device 197 also interacts with the coordination server 141 and presents a list of task received for completion by a corresponding user. A training manager 179 of the coordination server 141 provides training material such as audio instructions or a training video when requested by the user of a mobile device such as the head-up display mobile device 197. The mobile devices, such as the first mobile device 121 comprises a VR manager 117 that helps presents a VR training material to a user, or a VR display of a route along which the vehicle is about to travel, etc.

A request manager 115 in the first mobile device is employed by the client software 123, to receive from the first mobile device requests for food, requests for drinks, requests for supplies provided by the user and communicates them to one or more local business along a current route. In a related embodiment, the requests are communicated to local businesses via the coordination server 141, that stores information on local businesses 159 and facilitates communication of requests to them selectively. The request manager 115 receives and displays confirmation messages from the one or more local business in response to the requests for food, requests for drinks, requests for supplies and communicates it to the client software 123 of the first mobile device.

Coordination of completion of tasks by one or more users, each employing their own respective mobile devices 121, 161, 197 is facilitated by the task coordinator 183. Collaborative completion of tasks assigned to the first user, which is eventually completed between the first user and the second user (for example), is managed by the task coordinator 183.

In one embodiment, the first mobile device 121 with a client software 123, used by a first user, is installed (factory installed or after sale user-installed) in a vehicle, such as an automobile or van, in one embodiment, and is capable of displaying adhoc tasks assigned by a coordination server 141. The coordination server 141, for example, discovers that a vehicle that has the first mobile device 121 associated with it or installed in it is passing by a customer's location and that the customer's recently reported tasks can therefore be assigned to the user of the first mobile device 121 as that vehicle/user/mobile device is determined to be in immediate proximity to the customer's location. Partial or complete task completion of the customer's tasks assigned to the user of the first mobile device 121 in an adhoc opportunistic manner is monitored, tracked, and reported.

In one embodiment, the mobile device 121 is used for telematics and user interaction. It is pre-installed in a vehicle and also is installable in the dashboard of a vehicle after manufacture. It comprises a global positioning system (GPS) receiver circuitry, and is configured to be mounted inside a vehicle or fixed on the dashboard of the vehicle. It comprises a display which makes it possible to display tasks to be completed, maps and routes to be displayed, and status of tasks provided when solicited. In a related embodiment, first mobile device 121 is associated with or installed in a vehicle and it collects and reports from the vehicle's various electronic control units (embedded in the vehicle, for example) status information and a diagnostic information and sends it to the coordination server 141. It monitors the behavior of the vehicle, the behavior of a driver and reports them too. The coordination server 141 is capable of tracking location, movements, status and behavior of the vehicle and the behavior of the driver. For example, Monitoring vehicle metrics can save your fleet a lot of money, helping you to avoid expensive mechanical failures or unsafe working conditions that can be a huge liability. For example, sensors in the vehicle detect and alert the first mobile device 121 to water in the fuel tank (water is incredibly damaging to diesel engines, corroding injectors and quickly causing irreparable damage), to worn out struts, to brakes that don't work well, to an air conditioner unit that is inefficient, etc. This facilitates early detection of problems in the vehicle, and the first mobile device 121 send notification and alerts to the coordination server 141 as necessary. Similarly, the first mobile device 121 gets report from electronic control units on metrics such as excessive idling of the vehicle's engine. For example, idling gets 0 mpg and is often needless and wasteful. By reporting on idling on engines and other driver habits, the first mobile device 121 helps save thousands of dollars to operators who would like to know which drivers and vehicles were idling excessively.

The first mobile device 121 also, in one embodiment, facilitates customer telematics for drivers and passengers of a vehicle where it is installed. It provides infotainment and task assignment and task completion reporting functions. In addition, it reports system failures, engine troubles, etc. to the coordination server 141 which can then send appropriate alerts to operators, etc.

The present invention facilitates communicating, from the first mobile device 121, arrival information at a waypoint, communicating that information to the coordination server 141, receiving a set of tasks (statically assigned or dynamically assigned) for the user (for example, from the coordination server 141 or from the second user), displaying the set of tasks to the first user, receiving a completion response (successful or unsuccessful) from the user, and proceeding to the next waypoint along a route/trip plan.

The mobile web system 101 makes it possible for customers to specify tasks that users of the mobile device are expected to execute. Typically, these customers have a customer location associated with them, and therefore, the corresponding tasks are also associated with the customer location. The first mobile device 121 gets tasks assigned to the user of the first mobile device when the first mobile device 121 is determined to be in proximity with a customer location. The coordination server 141 keeps track of customer tasks dynamically created, and it assigns it to the first mobile device 121 it determines to be in proximity to the customer location. Often it factors in the current destination of a user and the current location of the user (as evidenced by the location of the first mobile device 121) in determining which customer's tasks are assigned for execution by the user of the first mobile device 121.

A dynamic task manager 187 receives tasks reported dynamically (in an adhoc manner, for example) by registered customers, such as businesses or warehouses with goods to be delivered or picked up, or fleet management companies with logistic plans. A customer can report tasks to be conducted, such as various manufactured items to be picked up for delivery, invoices to be picked up, etc.

A customer manager 189 in the coordinator server 141 makes it possible to manage customer profiles including their locations, delivery and pickup schedules, security information, typical authorized tasks to be assigned to various users of mobile devices in the network, etc.

In general, the client software 123 and client software 163 comprise similar functionality and are capable of sending/receiving location information (GPS based, navigational data based, etc.), specifying tasks for another user when the another user reaches a destination associated with the location information, communicating the tasks to the another user on his mobile device when the another user has reached the destination, and receiving a confirmation from the another user that the task is completed (done), skipped or deferred. The another user employs the mobile device that also comprises the client software 123.

In one embodiment, the user of the first mobile device 121 can create tasks and assign them to the second user, employing an entry in a PIM 137 or contact list available in the first mobile device 121 to identify the second user and select him from a list. The user employs the client software 123 for this purpose, wherein the client software 123 employs a task manager module 139 to create/edit/manage the tasks. The tasks can be saved locally and communicated to the second mobile device 161 when the second mobile device 161 (or the second user) sends a notification when approaching a destination or after approaching the destination. The tasks can be also saved remotely at a task database 181 associated with the coordination server 141, and communicated to the second mobile device 161 when the user of the second mobile device 161 sends a notification when approaching a destination or after approaching the destination. At the coordination server 141, the task in the task database 181 is associated with the destination specified, wherein the destination is also stored in a routes and waypoints database 153.

When the first user using the first mobile device 121 is given a ride to his house, such as by the second user, using his vehicle (and perhaps the second mobile device 161 which may be part of the vehicle or separate from it), the second user can save the location coordinates, such as using GPS coordinates, employing the client software 163 available in his GPS enabled second mobile device 161. In particular, the personal information manager (PIM) 177 available in the second mobile device 161 is used by the client software 163 to store the location coordinates, and associate it with the first user's contact information available (or created) in the PIM 177. In one embodiment, the second user is prompted to select one or more PIM 177 entries (contacts in the PIM) and associate the location coordinates with the PIM 177 entries. The updated contact information stored in the PIM 177 comprises GPS coordinates and other navigational data (including optional routes). Such updated contact information can be retrieved in standard formats, such as VCF, and sent as attachments to emails, instant message, etc. When the first user sends an email, and attaches his contact information, such as a contact information in VCF format, the GPS coordinates typically associated with his address (him home address, for example) is sent in the contact information. In one embodiment, the first user's current location coordinates is retrieved using the client software 123 in the first mobile device 121 (dynamically, as and when needed) and incorporated into the contact information in VCF format that is sent as an attachment in an email, etc.

The PIM 137, 177 entries can be stored at a coordination server 141. In one embodiment, users can upload (or enter using a webpage) their own home addresses and business addresses and corresponding GPS coordinates to the coordination server 141.

The coordination server 141 offers a service that, given an address, retrieves GPS coordinates and displays it or communicates it. It also is capable of computing GPS coordinates for a given address. The coordination server 141 is capable of providing a contact information for a given email address based or a given user wherein the contact information also comprises location information such as GPS coordinates for the user. It facilitates retrieving contact information in a VCF format that also incorporates GPS coordinates. The coordination server 141 also offers a service wherein a user can retrieve (from his first mobile device 121, for example) location information for a given phone number or email address. For example, a user can use the phone number of a business and retrieve GPS coordinates for (at least one office/branch/store) the business, or a list of GPS coordinates for one or more locations where the business has a presence. The coordination server 141 also makes it possible to compute geocoding based location information in terms of, for example, latitude and longitude when given an address or a phone number. The present invention makes it possible to map a phone number (of a business or residence, for example) into GPS coordinates (such as longitude and latitude). It also makes it possible to dynamically retrieve that information from the first mobile device 121 if necessary, and with optional first user consent. In a related embodiment, the coordination server 141 maintains a database mapping phone numbers to addresses (and GPS coordinates or is able to compute them from the address) and it provides GPS coordinates and addresses in response to a request by the first user (from the first mobile device 121, for example) wherein the first user provides a phone number as part of the request.

In one embodiment, the client software 123 in the first mobile device 121 communicates a phone number of a business to the coordination server 141 along with the first user's (own user) address or phone number. The coordination server 141 determines a detailed route for traveling from a starting point associated with the first user's phone number (or address) to the destination associated with the business (as determined using the phone number of the business and other related information) and sends details instructions that can be used by the client software 123 in guiding the first user to the destination. Such detailed instructions comprise textual directions, audio directions, maps, places to see and things to do at those locations, or a combination of these.

In one embodiment, the first mobile device 121 does not comprise a GPS circuitry and navigational software. It acquires a current location information, such as GPS coordinates or an address and communicates it to the second mobile device 161, which comprises a GPS circuitry and navigational software. The second mobile device 161 receives the current location information of the first mobile device (such as, directly from the first mobile device 121, from the coordination server 141, etc.) and accepts it, stores in optionally, and navigates to that location.

The user of the first mobile device 121 selects a plurality of addresses using the client software 123 (that browses through the PIM 137 contact lists for example, or other stored set of GPS coordinates) and the client software 123 then determines an optimal route (employing the navigation manager module 129, for example) through those addresses selected. For example, it uses the selected addresses as waypoints and determines an optimal route through them, based on time or distance used as a routing criteria. The client software 123 sends notification to other users along the destination(s) to automatically inform those users of the "approach" and arrival at those destinations(s). In addition, any responses to the notifications sent by the other users from those destination(s), are received by the client software 123 and displayed to the user of the first mobile device 121. The optimal route through those addresses selected by the user can be saved (at the first mobile device 121 and also at the coordination server 141) for subsequent sharing and use. The user can also enter planned/recommended activities for locations associated with those addresses. In addition, the client software can retrieve and incorporate those recommended activities from an external server (for example). The user can optionally download/retrieve tasks assigned to the user for those addresses. The user of the first mobile device 121 can also skip one (or more) of the plurality of addresses identified as destinations along a planned route, using the client software 123. The client software 123 facilitates re-computing of a planned route (or rerouting in general) and enables the user to navigate and travel to the other destinations of interest while skipping the specified ones. In one embodiment, both the notifications sent and responses received are in audio form, although they can be supplemented by textual messages too. In a related embodiment, the coordination server 141 facilitates the sending of notifications by the first mobile device 121 and the receiving of optional responses to those notifications by the first mobile device 121.

The first and second mobile devices 121, 161 are one of a GPS enabled mobile phone, a navigational device (such as a Garmin, TomTom, etc.), a navigational unit in a vehicle (such as a car, motorcycle etc.), a PDA, a laptop with a navigational circuitry/navigational software, etc. They comprise the client software 123, 163 and navigational circuitry, in general.

The coordination server 141 also comprises a task manager 183 that facilitates sending, receiving and storing of tasks by users. In particular, the first user can assign tasks to a second user that need to be completed/attended to when the second user is at a destination (such as a waypoint along a route). In one embodiment, when the first mobile device 121 automatically informs the coordination server 141 (or the second mobile device 161) that it has reached a certain destination, the coordination server 141 distributes tasks assigned to the first user (of the first mobile device 121. For example, the first mobile device 121 may be navigated by the first user, after it has received location information of a destination from webpage or from a route obtained from the coordination server 141 or from the second mobile device 161 (which can be specified as GPS coordinates, landmark information, etc.). The first mobile device 121 guides the user of the first mobile device 121 to that destination. Then the client software 123 of the first mobile device 121 automatically sends a notification with a message comprising the text "Arrived" when it reaches a destination employing the received location information, to the coordination server 141. The coordination server 141 then automatically retrieves tasks if any that are assigned to the first user to be completed (or to be assigned to the first user) on reaching that specific destination. It communicates those tasks (for example, as a list of tasks) to the first mobile device 121 where it is displayed to the user, prompting the user to review them, and execute them if possible. The user is prompted to enter a response after completing those tasks (for example) indicating completion, failure to complete, deferring completion, etc.

The first mobile device 121 comprises the client 123, a processing circuitry 131, a storage 133 and a GPS/navigational circuitry 135. It also comprises the optional PIM 137 (such as a contact list client and database). The client software 123 comprises a GPS management module 125, a navigational coordination module 127, the task manager module 139 and a notification manager module 129. The a GPS management module 125 interacts with the GPS/navigational circuitry 135, retrieving GPS coordinates, setting GPS coordinates for a destination to which the user wants to go, interacting with the navigational coordination module 127, etc. The client software 123 facilitates browsing through the PIM 137, selecting one or more users contact information (comprising an address, GPS coordinates or location information in some format, or even a phone number) to be used as destinations/waypoints, and incorporating their associated locations as waypoints in a planned route (or a route computed). If the PIM 137 entries for any user comprises a phone number, the coordination server 141 is employed to retrieve an associated address and/or GPS coordinates that is then employed for navigating/routing. Thus dynamic routing is possible when the coordination server 141 provides a dynamically determined location information (such as GPS coordinates) for a given phone number (such as a mobile phone number).

The coordination module 127 facilitates setting landmark information where a user desires to go, guiding a user to reach a destination, following a route (according to a trip plan) to reach a destination, retrieving and displaying a computed route, distance and estimated arrival time for reaching a destination, etc. The notification manager module 129 facilitates receiving notification from other mobile devices and displaying them, sending notifications to other mobile devices informing them of a proximity information, approaching information, arrival information, billing information, etc. The second mobile device 161 also comprises modules and circuitry similar to those in functionality that are described here for the first mobile device 121.

The coordination server 141 makes it possible for the first mobile device 121 to interact with one or more other mobile devices, such as the second mobile device 163. It facilitates communication of notifications, GPS coordinates, navigational information such as trip plans, routes, landmarks, distances, approaching and arrival information, etc. It also facilitates billing for trip plans shared with others, trip plans purchased, services accesses such as notification to a waiting user of a first mobile device who needs to know if his ride has arrived, etc.

The coordination server 141 comprises a waypoint and route storage 143, a registration manager 145, a notification coordination module 147, the task manager module 183 and a database 149. The waypoint and route storage 143 stores and retrieves uploaded trip plans, routes, waypoints, bookmarks, etc. A user can upload them for sharing, and optionally bill others for downloading or using them. The registration manager 145 facilitates user registration and service access, wherein user registration comprises creating an account, optionally setting up a billing account, establishing a login and password, and enabling security services. The registration manager 145 makes it possible for users to register the details of their mobile devices such as one or more of a phone number, an IP address, a device serial number such as ESN or IMEI, MSISDN, a subscriber information, etc. It also facilitates registration of phone numbers and other details of friends and family with whom a user's mobile device is likely to share navigational information, receive notifications and requests for navigation data sharing, etc. The notification coordination module 147 facilitates sending notifications and receiving notifications. The coordination server 141 also comprises the task manager 183 that facilitates creation of tasks, assignment of tasks to users, communication of tasks to a user on his mobile device/navigational unit when the coordination server 141 receives a message/communication from the mobile device indicating arrival at a waypoint, and the management of the lifecycle of the tasks and transitions of the states.

The database 149 comprises a contacts and friends list database 151 that makes it possible to specify (and control) who gets to participate in interactions with a registered user, by default. It facilitates mapping (and retrieving) phone numbers to addresses and/or GPS coordinates, for example. It also comprises a routes and waypoints database 153 that is used to store, retrieve and manage waypoints, trip plans and routes uploaded for sharing by users, those that are made available for sale by businesses, etc. The database 149 also comprises an audio and video content database 155 that is used to store, retrieve and manage audio, video, graphic and textual content that a user would enter as user specified data (recorded by the user for example) for a trip plan or waypoint saved and/or shared by the user.

The database 149 also comprises a tasks database 181 that is used to store and retrieve tasks for a plurality of users, wherein the tasks are associated with one or more waypoints. The waypoints are associated with routes assigned to a user or with a trip plan created for/by the user. The user is expected to execute the tasks at the specified waypoints, and report a success or failure information back to the coordination server 141. For example, the user can indicate that a task has been completed, has been deferred or has been skipped. Similarly, the user can indicate if a waypoint along a route has been skipped, in which case any tasks associated with those waypoints are reassigned to other users or deferred until the user reaches those waypoints in a future trip.

The coordination server 141 facilitates communication of a list of tasks assigned to a user to be performed at a specified location. The list of tasks is delivered to the user of the first mobile device 121 by the coordination server (if such tasks exist) when the coordination server 141 receives notification from the first mobile device 121 indicating arrival at a specific location (that may be predetermined as part of a route, or a destination dynamically selected by the user). The client software 123 in the first mobile device 121 displays the list of tasks, and collects confirmation from the user that they were completed (or not). In addition, user inputs for those tasks, in the form of a from data entry, audio inputs, textual data entry, etc. are collected, and stored, and eventually communicated (and sometimes immediately communicated, based on configuration or needs, for example) to the coordination server 141. The list of tasks may be dynamically determined based on one or more criteria, or they may be a predetermined list of tasks identified by the user. In a related embodiment, the tasks are described in audio form that a user of the first mobile device 121 can listen to, and provide feedback to (such as after successful or unsuccessful completion of the task), the feedback being provided in an audio form (voice inputs for example) or in textual form (or as part of a response screen presented to use wherein user checks radio buttons, etc.), etc. In addition, a task assignment module provided by the coordination server 141 facilitates identifying tasks (that are available and presumably not completed) and assigning them to the user, as relevant. These tasks can be identified from a general pool of tasks or from a user-specific pool of tasks (that may have been created by the user himself, for example). Task completions are noted and the pool of tasks are updated, as necessary.

The client software 123 of the first mobile device 121 also comprises a task manager module 137 that facilitates displaying a list of tasks assigned to the user for individual waypoints along a route, prompting the user to provide a task completion response (for example, done, defer, skip), communicating the task completion response to the coordination server 141, etc. It keeps track of skipped and deferred tasks to enable a user to complete them later, if necessary. The coordination server 141 also keeps track of the response received to the tasks so as to be able to reassign some of the plurality of tasks, if necessary, to the same user or to a different user.

In one embodiment, a mobile device 121 is used for telematics and user interaction. It comprises a global positioning system (GPS) receiver circuitry. The mobile device 121 is configured to be mounted inside a vehicle or fixed on the dashboard of the vehicle. It is configured to interact over a telecommunications network or Internet with a coordination server 141. A client software in the mobile device 121 comprises a navigation component that interacts with the GPS receiver circuitry, the navigation component being capable of providing directions to a destination to a user of the mobile device 121. The client software is configured to receive and forward to the coordination server diagnostics and system failure information from a plurality of electronic control units associated with the vehicle.

The client software sends a notification to the coordination server 141 along with a current location and a current destination. The client software dynamically accepts and presents a task list comprising a plurality of tasks sent from the coordination server 141 in response to receipt of the notification, wherein the task list is opportunistically provided by the coordination server based on a current pool of dynamically assembled tasks, the current location and the current destination. The coordination server 141, for example, takes advantage of circumstances when it determines that a vehicle is driven by a user of the first mobile device 121 close to or in proximity to a customer location where a customer has a task to be performed, such as a pickup of products for delivery. The coordination server 141 determines that one of the vehicles with mobile devices can be assigned a task to be conducted by an associated user/driver, as the vehicle approaches, without any preplanning or coordination, a customer's location who has an adhoc task to be conducted. The coordination server 141 for example finds the mobile device 121 to be (serendipitously, for example) in proximity to a location of a customer who wants a task conducted, such that the task can then be assigned to a user (such as the driver of the first vehicle that comes in proximity) of the mobile device 121. The coordination server 141, in an adhoc manner, seizing the opportunity to get a task executed with the help of a serendipitously located vehicle/user of mobile device 121 assigns the customer's task to the mobile device 121. Thus the coordination server 141 takes advantage of the possibility of assignment of a new task reported by a customer to a first vehicle/user who happens to come close enough to the customer's location, while going about on a regular scheduled route, such that the vehicle/user can then be assigned a new task for the customer's needs, or have his schedule of tasks adjusted to accommodate the customers new needs. Such adhoc tasks for a customer can be pickup of products for delivery elsewhere, drop off/delivery of products, repairs, service delivery, etc.

In a related embodiment, the coordination server 141 receives a notification from a client software in the first mobile device 121, the notification indicating a current location and a current destination of the vehicle/user/mobile device 121. In response, it dynamically and opportunistically identifies a task list and communicates the task list to the first mobile device 121, wherein the task list comprises a plurality of tasks to be performed by a user of the first mobile device. Specifically, the the coordination server 141 accesses a general pool of currently available tasks filtered by the current location and the current destination of yhe vehicle/user/mobile device 121, and a user-specific pool of tasks, to identify the task list for the user, and wherein, upon determination of task completion, the status for the corresponding entries in the general pool of tasks and the user-specific pool of tasks are updated.

In another related embodiment, the coordination server 141 communicates with a plurality of mobile devices (such as mobile device 121), each of the mobile devices may be installed or built into a corresponding vehicle (such as a car). The coordination server 141 dynamically receives customer specific tasks from specific customers, wherein the customer specific tasks each have a specific location associated with it. The customers specify the tasks so that they can be executed by appropriate ones of the users of the mobile devices based on assignment by the coordination server 141. The coordination server 141 opportunistically assigns each of the customer specific tasks to any mobile device whose current location is determined by the coordination server 141 to be in proximity to the specific location associated with the customer specific tasks. Thus the coordination server 141 is capable of determining, dynamically and opportunistically, in response to receipt of the notification from the first mobile device 121, a task list for completion by the user of the first mobile device 121 at that one of a plurality of waypoints to be visited by a user of the first mobile device 121.

In one embodiment, the coordination server 141 communicates to the first mobile device 121 to present to the user of the first mobile device 121, a first plurality of dynamically and opportunistically identified tasks that are relevant to a first customer at a current location (which is determined to be the location of the first mobile device 121), and a second plurality of tasks that are associated with a second customer at a next location along a route, wherein each of the tasks in the first plurality of tasks and the second plurality of tasks comprise at least one of a textual description, an audio description and a video description.

In one embodiment, the coordination server 141 is capable of determining available tasks for a first user at a current location of the first mobile device, by searching a task database for available tasks that can be assigned to a first user currently associated with the first mobile device. It takes into consideration the fact that the first user is located at the current location travelling towards the current destination, or the fact that the first user is approaching a new location. The available tasks comprise dynamically provided tasks specified by customers for execution by a user(s) in proximity to an associated location, (i.e. the current location of the user) each of the dynamically provided tasks comprising a target location specification.

In one embodiment, the mobile device 121 reports user behavior information and vehicle behavior information to the coordination server 141, which assembles such data into a user profile (such as a driver profile) and a vehicle profile. In a related embodiment, the task related profiles are assembled and managed by the coordination server 141, which comprises information on how long the tasks take for completion, how many users/mobile devices are involved in the task, and how frequently such tasks are assigned and executed. These profiles can be reviewed, shared and also sent to billing server for billing if necessary. Thus user behavior, vehicle behavior, etc. are monitored, managed and used for training as necessary. In addition, aberrant behavior, if determined, is flagged, for vehicle or for user (driver of vehicle, for example).

In one configuration, the coordination server 141 retrieves and presents information based on location to one or more users and facilitates collaboration is the completion of tasks along a route. The coordination server 141 also comprises a mapping manager 145, a task coordinator 183 and a training manager 179. The mapping manager 145 maps a contact information into geo coordinates and when provided with the contact information responds back with a corresponding geo coordinates comprising latitude, longitude and elevation. The task coordinator 183, when triggered by the mapping manager as it receives from a first mobile device 121 the contact information, dynamically responds with a list of tasks and presents it to a first mobile device 121 for completion by a user.

The coordination server 141 receives and processes, from the first mobile device, a corresponding user provided response and status information for the list of tasks. It presents alerts to the user of the first mobile device 121 when it detects that the user has exited a location without completing one or more tasks from the list of tasks that have been assigned for completion at that location. The list of tasks comprises a first set of tasks currently assigned to the user and a second set of tasks, if any, created by the user. The coordination server 141 also comprises at least one processor, memory and storage, wherein the at least one processor when instructed, or as required, executes the mapping manager and the task coordinator in order to provide their corresponding functionality.

The coordination server 141 provides the list of tasks on a map presented to the first mobile device 121 for visual inspection and completion by a user, wherein each of a plurality of items in the list of tasks is represented by an icon on the map presented. The coordination server, in response to selection of any of the plurality of items by the user, provides audio and textual instructions that aid in execution of the corresponding task, along with details of the corresponding task A waypoint and route manager 143 highlights the user's favorite restaurants, users preferred banks and user's preferred gas stations on the map along the route.

The first mobile device 121 in one embodiment is a portable head-up display device that is mountable on the steering wheel of a vehicle as well as on the dashboard of a vehicle. The headup-display mobile device 197 has features and supports functionality similar to those provided by the first mobile device with additional capabilities of hand gesture input, vice input, and iris based authentication and user input.

The coordination server 141 provides the list of tasks on a map presented to the first mobile device 121 for visual inspection and completion by a user, wherein each of a plurality of items in the list of tasks is represented by an icon on the map presented. It presents on the map, when requested by the user, local areas frequented by the user, businesses frequented by the user, businesses that frequently deliver food and supplies to the user regularly, time spent by the user of various local landmarks, and related statistical data. It receives from the first mobile device 121 requests for food, requests for drinks, requests for supplies provided by the user and communicates them to one or more local business along a current route. The coordination server 141 receives confirmation messages from the one or more local business in response to the requests for food, requests for drinks, requests for supplies and communicates it to the first mobile device. The coordination server 141 facilitates navigation by the user to the one or more local business for pickup of corresponding food, drinks and supplies requested.

In one configuration, the contact information is one of an address, a phone number and a name and the coordination server 141 further comprises an address to geo coordinates converter 199 that, when provided with an address of a residence, building or office responds back with a latitude, longitude and elevation. The coordination server 141 also comprises a phone number to geo coordinates converter 107 that, when provided with a phone number associated with a residence, a building or an office responds back with the latitude, longitude and elevation.

The mapping manager 145 also maps the name of a business or residence into geo coordinates, and when provided with the name responds back with a corresponding geo coordinates comprising latitude, longitude and elevation.

The coordination server 141 manages tasks, sends messages to the first mobile device 121 and the headup display mobile device 197 and receives user selections from the first mobile device and the headup display mobile device 197 received through a corresponding user's voice commands and hand gestures. The task coordinator 183 receives user specified new tasks from the first mobile device 121 and stores them for subsequent distribution to the user or retrieval by the user, based on a current location of the first mobile device 121.

The coordination server 141 processes user voice commands received to locate places in proximity determined to be of interest to the user based on observed user habits and responds by providing geo coordinates and directions to those places in proximity. It sends detailed instructions that can be used by the first mobile device 121 in guiding the first user to a user specified destination along with the list of tasks along that route to be completed by the first user enroute to the destination, wherein the detailed instructions comprise textual directions, audio directions, maps, places to see and things to do at those locations, or a combination of these.

In another configuration, the coordination server prompts the user using the first mobile device 121 to select one of plurality of restaurants along a current route. It then receives from the user an user order for purchasing an item for communicates the user order to the one of plurality of restaurants.

The coordination server determines that a user of the first mobile device 121 has only partially completed a specific task A from the first set of tasks or the second set of tasks and reassigns the partially completed task A to another user associated with the second mobile device 161. The coordination server 141, upon determining that a second user employing the second mobile device 161 is also travelling along a current route taken by the first user employing the first mobile device 121, reassigns a subset of the list of tasks to the second mobile device 161 for completion by the second user.

The coordination server receives a task training request for a specific task from the user of the first mobile device 121, communicates training material to first mobile device 121, and selectively conducts a charging transaction to charge the user a training fee. The training material comprises an interactive virtual reality video session that trains the user on executing the specific task. In a related configuration, the coordination server, when requested, provides a virtual tour video session to the first mobile device 121 showing a turn by turn street level virtual reality video from the current location of the first mobile device 121 to one or more destinations along a route formed by the locations associated with a dynamically determined second list of tasks. The user of the first mobile device 121 optionally wears a virtual reality headset that is plugged into the first mobile device in one embodiment, in order to view the virtual reality video session that trains the user, as well as to experience the virtual tour video session.

In one embodiment, the list of tasks, presented to the first mobile device 121 for completion by the user, is dynamically determined based on the type of vehicle the user is currently employing for his commute or travel.

In one embodiment, the first mobile device 121 is configured to interact with a server system such as the coordination server 141, the server system being configured to perform conversions of contact information to corresponding geo coordinates data. The first mobile device 121 comprises a microphone configured to capture a first portion of input data, a touch and gesture sensitive screen configured to capture a second portion of input data, a first communication circuitry configured to connect with a communication means of the server system and a processor configured to support a first operational mode and a second operational mode. The first operational mode involves internal handling of both the first and second portions of the input data, and the second operational mode involves delivering at least a portion of the first and second portions of the input data to the server system and receiving from the server system a dynamically computed task list. The processor of the first mobile device 121 is further configured to receive directions to navigate to a first location associated with a first one of the tasks in the dynamically computed task list and upon determining the arrival at a point within specific proximity to the first location, prompting a user to provide completion status for the first one of the tasks.

The first mobile device 121 is also configured to facilitate task assignment to the user and task completion by the user when located inside a vehicle used for travel by the user, the first mobile device 121 is further configured to (employing the processor) monitor the behavior of the vehicle, the behavior of a driver of the vehicle and reporting them to the coordination server 141. It is also configured to track routes frequently taken by the user, retrieve from the coordination server current tasks assigned to the user that are to be conducted at locations in proximity to a current anticipated route taken by the user, present instructions to facilitate execution of current tasks when requested, prompt for completion status of the current tasks, and track incomplete ones of the current tasks.

In one configuration, the first operational mode involves internal handling of both the first and second portions of the input data. In response to the input data, a previously saved route is presented and the route is highlighted on a map shown. In response to the input data, the mobile device 121 in this mode selectively displays user's preference of businesses, restaurants and gas stations on a map shown. Upon further user request it provides navigation information to the user to user selected businesses, restaurants and gas stations.

The first mobile device 121 electronically records receipts, invoices, tokens and bills for products purchased, products delivered, services rendered and information collected as part of the execution by the user, of one of the tasks from the dynamically computed task list. The first mobile device 121 provides supplementary information in audio, video or virtual reality format to the user for any of the tasks to be completed from the dynamically computed task list. The user might elect to wear a virtual reality headset optionally to experience supplementary information in virtual reality format.

The collaboration server 141 initiates automatic collaboration by the first user of the first mobile device 121 with a second driver using the second mobile device 161 for task completion, and facilitates VR based user training, as required for the first user and second driver. The status of the task list (and of individual tasks in the task list) on which the first user and the second user collaborate is updated by the collaboration server 141 based on which of the collaborating individuals complete those tasks at or near the assigned locations along a route.

In one related embodiment, the collaboration server 141 makes it possible for a first user of the first mobile device 121 to view the execution of a task completed by a second user asked to collaborate with him, wherein the second user employs the second mobile device 161 to conduct a similar task, or a related task. Such viewing employs video streaming in one related embodiment, and an augmented reality streaming in another related embodiment.

Figure 2:
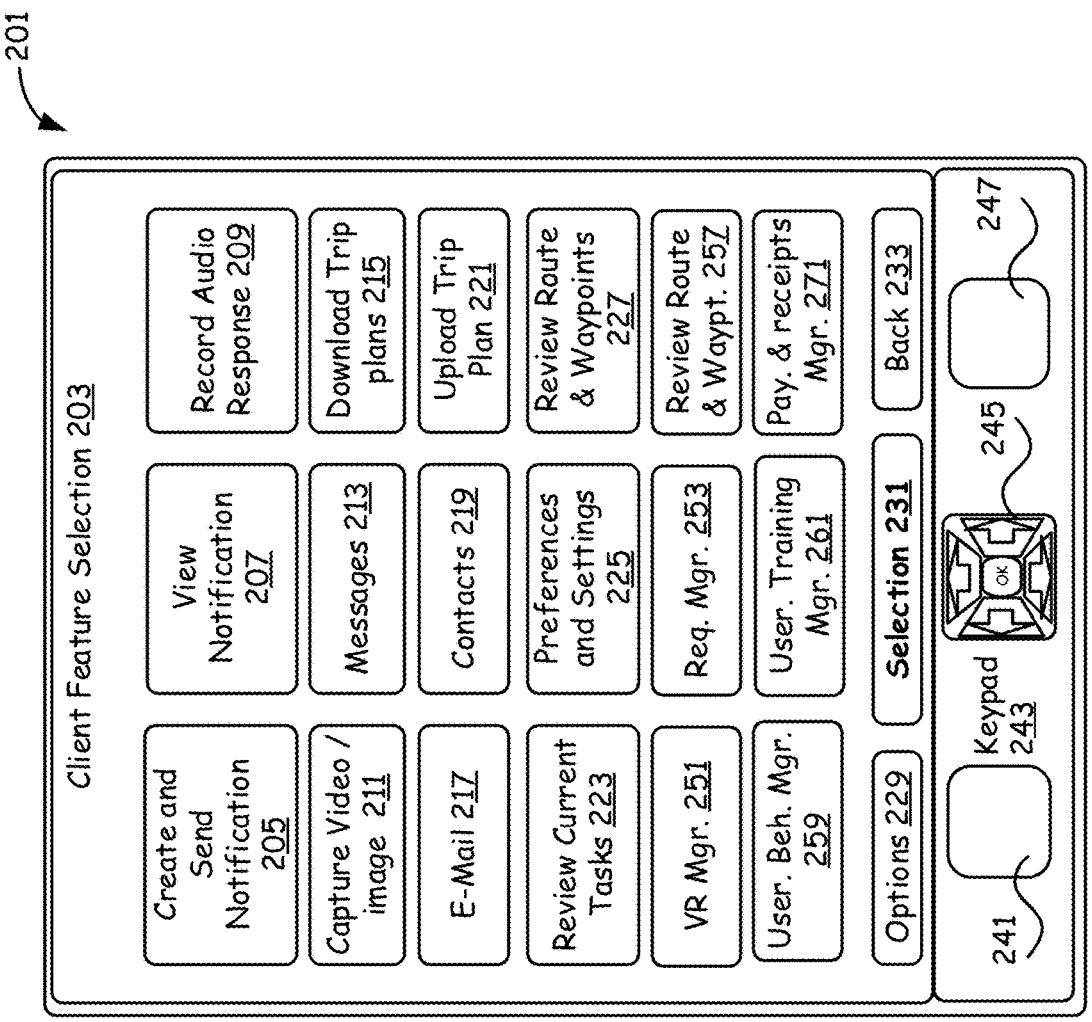
FIG. 2 is an exemplary snapshot of a client feature selection screen of the mobile phone that is presented by the client software that is installed and run in the mobile device in accordance with the present invention.

FIG. 2 is an exemplary snapshot of a client feature selection 203 screen of the mobile phone 201 that is presented by the client software 123 that is installed and run in the mobile device 201 in accordance with the present invention. The client feature selection 203 comprises the buttons/icons list from 205-227 whose selection will accomplish the corresponding functionality. The various features of the client software can be invoked by a user employing the buttons/icons presented on this screen. This screen has buttons/icons such as 'Create and Send notification' 205, a 'view notification' 207, a record audio response 209, a capture video/image 211, a messages icon 213, a Download Trips icon 215, an E-mail icon 217, a Contact (PIM) icon 219, an upload trip plan icon 221, a review current tasks icon 223, a Preferences and Settings icon 225, and a review route & waypoints icon 227.

When the user selects the create and send notification button/icon 205 the client software in the mobile device 201 makes it possible for the user to create a new notification from a list of canned notification messages or make a new one. In particular, the client software makes it possible to send the notification to another mobile device. For example, a canned notification comprising the message "About to arrive at destination" is sent to a user of another mobile device to announce the impending arrival at a destination, the location to which had been previously received from the another mobile device.

The view notification icon 207, when activated, invokes screens that facilitate viewing notifications received and notifications sent. In one embodiment, as soon as a notification is received, it is presented to the user in a view notification screen. In addition, a ring, or a jungle is optionally play to bring it to the user's attention. The user can also respond back to the notification, such a response can be provided using audio recording facilities, selecting an appropriate graphic response from a list of pre-created graphics, or by typing text. The record audio response 209 button activates audio functions, such as those that are used to record an audio response, or those used to play audio responses received. In general, a user can choose to provide an audio input to a received notification immediately, or in a deferred/delayed manner, using the record audio response 209 facility.

The capture video/image icon 211 starts video recording, digital photo capture or imaging functionalities. It can also be used to review received video content and play them. The messages icon 213 is used to send messages, for example an SMS message to other mobile phones and client computers. In one embodiment, it is used to send a canned message (pre-recorded) to one or more recipients using the coordination server, wherein the canned message (which may be pre recorded by the user or provided by the service) is either stored and sent from the mobile phone 121 or retrieved from the coordination server 141. In this embodiment, the client 123 is transparently used for sending a message.

The Download trip plans icon 215 supports download of interactive content such as trip plans, from the coordination server, wherein the downloaded content is handled/processed by the client 203 for a service. For example, the trip plans may be tagged with an appropriate MIME type and the client 203 is invoked for content with those MIME types that the client 203 is registered to (and is capable of) handle. In one embodiment, Downloads trip plans 215 provides a shortcut through which a mobile web browser is started and prompts the user to enter a URL of the download site for downloading the trip plan contents.

The e-mail icon 217 starts an e-mail client on the mobile phone prompting the user to login into his e-mail account for sending and receiving e-mails comprising notifications, trip plans, etc. The Contacts icon 219 is the user interface to the 'PIM' (personal information management) available in the mobile device 121, 201, which facilitates managing the contact list available in the mobile device 121. The contacts managed in the PIM comprises individual entries for friends/colleagues, etc. and also names of groups of friends, wherein the membership (individual contact information for the members of the group) details are remotely available at the coordination server 141 (or even at an external service provider website, etc.).

The upload trip plan 221 icon facilitates uploading waypoints, trip plans and associated multi-media content, etc. to the coordination server 141. For example, a user is prompted to upload a trip plan that comprises a plurality of routes, each route comprising one or more waypoints and one more associated audio information, video information, pictures, textual descriptions, etc. In addition, each waypoint may one more associated audio information, video information, pictures, textual descriptions. The trip plan is stored as an XML file and uploaded as an XML in one related embodiment. Other forms of structuring, organizing and storing the related data are also contemplated. The trip plan is uploaded to one or more servers, such as the coordination server 141.

The review current tasks icon 223 opens a list of tasks currently assigned to the user that the user can review and provide a status information or response to. The user can review tasks assigned to him as well as task lists created by the user himself. The user can retrieve tasks assigned from the coordination server or those saved locally.

The Preferences and Settings icon 225 facilitates an interface for the configuration of the mobile device 201, 121 in terms of its appearance and performance. The review route & waypoints icon 227 provides a screen where lists of routes are presented, along with lists of waypoints/landmarks/etc. for each route, etc. The user can view tasks assigned (statically) for each waypoint along a route. Later on during navigation, additional dynamically assigned tasks also show up in the list while those reassigned to another user are deleted automatically from the list of tasks displayed.

The client feature selection screen 203 also comprises some soft keys/buttons such as an 'Option' soft key 229, a 'Selection' soft key 231, and a 'Back' 233 soft key. The default action is the 'Selection' 231 button on this screen (i.e. the client feature selection screen) of the highlighted icon when the OK button is hit on the 'joystick' 245 from the keypad 243.

Activating the 241 key from the keypad 243 will open the Options 229 functionality, which results in presenting the user with a list in a menu or sub-menu, which can be browsed using the 'joystick' 245. The 'Back' soft key/button 233 will be selected when the key 247 is activated on the keypad 243, to cancel the current screen to go back to the previous one.

The client software 123 of the mobile phone 201 also presents to the user a VR manager 251 that enables display of virtual reality training videos, and a virtual reality route review when requested by a user. The user of the mobile phone 201 optionally wears a virtual reality headset that is plugged into the first mobile device 121 in one embodiment, in order to view the virtual reality training videos that trains the user, as well as to experience the virtual reality route review. The client software 123 also presents a request manager 253 that enables sending user provided requests for food, drinks, supplies etc. to local businesses along a route and subsequent display of responses received for such requests from local businesses. It monitors user behavior using a user behavior manager 259 which can be configured to monitor various categories of user behavior including user preference of routes, user selection of alternate routes, user driving speed, user task completion data, user task non-completion data, user task performance data etc. A collaboration manager 257 makes it possible for a user to request collaboration from a second user currently driving along a current route. It also initiates collaboration automatically based on the list of tasks assigned to the first user, the second user and the route.

In one related embodiment, the collaboration manager 257 makes it possible for a first user of one mobile device to view the execution of a task completed by a second user asked to collaborate with him, wherein the second user employs a second mobile device to conduct a similar task, or a related task. Such viewing employs video streaming in one related embodiment, and an augmented reality streaming in another related embodiment.

Figure 3:
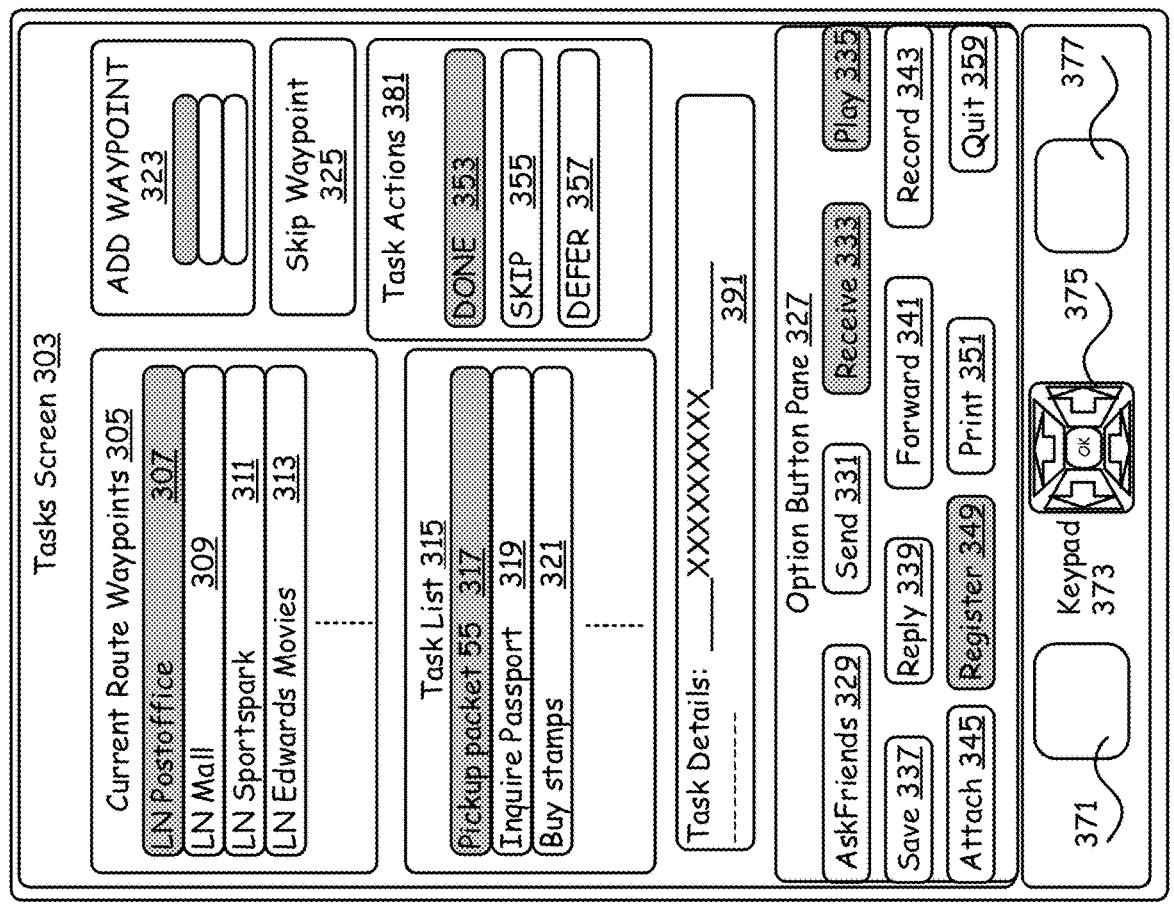
FIG. 3 is an exemplary screen snapshot of a mobile phone depicting the tasks careen used to review tasks and provide status/responses by a user conducting the tasks.

FIG. 3 is an exemplary screen snapshot 301 of a mobile phone 121 depicting the tasks careen 303 used to review tasks and provide status/responses by a user conducting the tasks. Such tasks are displayed in lists assembled dynamically by a coordination server and communicated to the mobile device 301, or previously assigned to the user and stored for subsequent access/display.

The tasks screen 303 comprises a current route waypoints 305 list that displays one or more waypoints 307, 309, 311, 313 associated with a current route, sent by the coordination server and dynamically changed (if necessary) by the coordination server or by the user. It also comprises a task list 315 that displays all the tasks associated with a selected waypoint, such as LN postoffice 307, which the user can select from the list 305. The user can select one of the tasks in the list 315 and provide a status information or response indicating completion, etc. For example, using the task actions 381, the user can indicate if a task is done 353, skipped 355 or deferred 357. When the user (and the mobile device) is in proximity to a waypoint destination the tasks for that waypoint/destination is displayed in the task list 315 and the user can try to complete the tasks and provide a response using the buttons in the task actions 381.

The user can add a waypoint to a route using the Add Waypoint pane 323. The user can also skip a waypoint from a route by selecting that waypoint and activating the skip waypoint button 325.

For a selected task in the task list 315, details of the task are displayed in a task details 391 pane/section. In addition, any recorded message can be played using the Play button 335. New tasks can be received dynamically by the mobile device, such as by triggering a receive button 333.

For example, the details of the tasks to be conducted by the first user of the first mobile device after reaching a previously specified destination may have been provided by second user and communicated to the first user navigating to the specified waypoint/destination. The first user would choose one of the tasks at a time, conduct the task, and provide a feedback employing the task actions 381. The first user would review the task details 391 if necessary and even listen to audio or video details for the tasks by activating the play 335 button.

The 'receive' button 333 is selected by a user to download all the tasks/messages and notifications that have been received by a user (into his registered user's account, for example). In one embodiment, the received data comprise tasks received, responses for tasks completed, etc. The tasks can be sorted by categories or sorted by date/time on the mobile phone 121 of FIG. 1. In one embodiment, the tasks received are identified by a task name/title.

Figure 4:
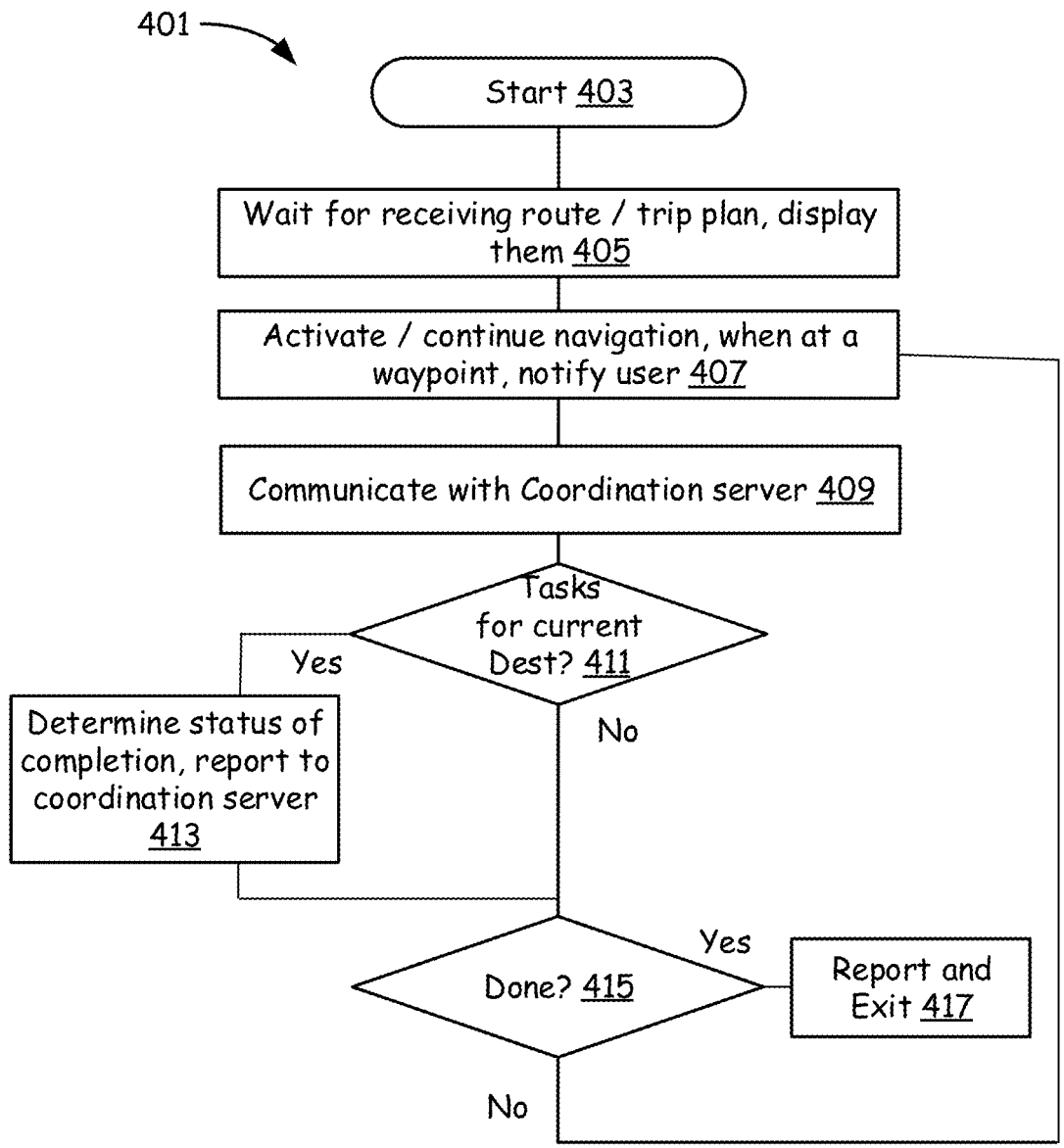
FIG. 4 is a flowchart of an exemplary operation of a first mobile device that is capable of receiving tasks assigned to a user when the user with the first mobile device reaches a destination specified where the tasks are expected to be completed by the user.

FIG. 4 is a flowchart of an exemplary operation of a first mobile device that is capable of receiving tasks assigned to a user when the user with the first mobile device reaches a destination specified where the tasks are expected to be completed by the user. The first mobile device comprises a client software capable of navigating to one or more waypoints/landmarks/addresses in a route provided, wherein the waypoints/landmarks information comprise a navigational data such as GPS coordinates.

At a start block 403, the processing starts in the first mobile device when the user starts navigating. Later, at a next block 405, the first mobile device waits for receiving route/trip plans, and displays them. The user may be prompted to accept the route/trip plan (and thereby provide consent). For example, the user of the first mobile device accepts a route/trip plan received and starts following the navigation guidance provided by the first mobile device. In general, waypoint/destination information is provided in the form of a landmark information, a GPS coordinates, etc.

Then, at a next block 407, based on the current route/trip plan, and navigational information thereof, such as GPS coordinates or alternative information (such as a landmark specification), navigation to the next waypoint/landmark is activated. At a next block 409, when the mobile device is at the waypoint/landmark, the user is notified and prompted to conduct the tasks, if any. In one embodiment, the tasks for that waypoint are retrieved from the coordination server by the mobile device after reaching the waypoint/landmark. The coordination server dynamically determines what tasks are to be assigned to the user at that waypoint/landmark. In a different embodiment, the mobile device automatically sends a message/notification to the coordination server on arriving at the destination (waypoint/landmark, etc.) and the coordination server automatically retrieves tasks (from a database or from an external system/computer) and communicates it to the mobile device.

Then, at a next decision block 411, an attempt is made to determine if the user of the first mobile device has any tasks assigned for the current waypoint/landmark/destination. If it is determined that the user does have one or more tasks to be conducted, then, at a next block 413, a determination of the status of completion of the tasks is made, and a report is communicated to the coordination server. For example, the user enters one of the available task actions (such as Done, Skip, Defer) for each of the tasks listed for the user for the current location. Control then passes to the next decision block 415 where an attempt is made to determine if the navigation in accordance with the route/trip plan is completed/done.

If, at the block 415, it is determined that there is no more waypoints/destinations to be visited in accordance with the route/trip plan, then, at a next block 417, a report is sent to the coordination server and the operation exits. Otherwise, the operation proceeds to the next block 407 where navigation proceeds to the next waypoint/landmark, and the user is notified after reaching the that location.

If, at the decision block 411, it is determined that user of the first mobile device does not have any tasks assigned for the current waypoint/landmark/destination, then at the next decision box 415, it is determined if there are no more waypoints/destinations to be visited in accordance with the route/trip plan.

In general, the present invention makes it possible to communicate multimedia contents along with task lists to the mobile device from the coordination server. In addition, routes can be dynamically changed and waypoints added/deleted by the coordination server, such as when a user has reached a waypoint and completes associated tasks, and the coordination server determines that it needs to change tasks at subsequent waypoints, or even to drop or add waypoints. This provides support for ad-hoc modifications to trip plans and routes, and adhoc navigation with consent of users. Such transfer of navigational information (routes being communicated, GPS coordinates being exchanged or waypoint information being exchanged) from the coordination server to the first mobile device is useful and timely. In addition, the combination of GPS coordinate communication with audio message notifications and subsequent responses is convenient for the users involved, with the use of keyboards minimized if not altogether eliminated.

The present invention discloses a mobile device comprising a global positioning system (GPS) receiver circuitry capable of pinpointing a location and providing directions to a destination. It employs a client software capable of interacting with the GPS receiver circuitry and activating navigation towards the destination. The client software receives a request to navigate to the destination from a second mobile device or the coordination server and accepts the request. It then navigates and provides directions to lead the user to the destination. It also automatically sends notifications to the second mobile device. The client software receives tasks and displays them for the user. The present invention also discloses a mobile web system comprising a server communicatively coupled to the first mobile device and the second mobile device. The server facilitates sending tasks to the first and second mobile devices after they arrive at a destination of interest. It also facilitates receiving notifications of task completions from a plurality of mobile devices that congregate at a location, and is able to verify their presence, challenge the users for verification/security, etc. The navigational coordinates are based on at least one of a latitude, longitude, and height system, earth centered Cartesian coordinates, earth centered earth fixed, earth centered inertial, and east north up.

The mobile web system 101 of the present invention also employs an embedded mobile device 121 or a user-installed mobile device 121 in a vehicle for communicating a current location and a current destination, to the coordination server 141, receiving a set of tasks (statically assigned or dynamically assigned) for the user (for example, from the coordination server 141 or from another user or adhoc tasks specified by a customer), displaying the set of tasks to the user, receiving a completion response (successful or unsuccessful) from the user, and proceeding to the next waypoint along a route/trip plan. The coordination server 141 facilitates communication of a list of tasks dynamically and opportunistically assigned to a user to be performed at a specified location. The coordination server 141 communicates with a plurality of mobile devices. It dynamically receives customer specific tasks for specific customers, wherein the customer specific tasks each have a specific location associated with it. It also opportunistically assigns each of the customer specific tasks to any mobile device from the plurality of mobile devices whose current location is determined by the coordination server 141 to be in proximity to the specific location associated with the customer specific tasks. The customer specific tasks are, for example, delivery pickup, supplies dropoff, repairs, maintenance, service delivery, billing, evaluation, quote generation, onsite inspection etc.

It should also be understood that if a user of the first mobile device 121 drives along an alternate route, after having completed a subset of the tasks on a task list assigned to him, the coordination server automatically reassigns unfinished tasks on that task list to a second user driving along the original route and using a second mobile devicel 161.

It should be appreciated that the mobile devices 121, 161 or the headup-display mobile device 197 are each capable of displaying virtual reality videos, augmented reality content, and streaming videos with the help of an attached headset, such as a virtual reality headset a user might prefer, if necessary.

It should be appreciated that the collaborative task completion involves the use of more than 2 mobile devices, and require the collaboration of more than 3 individual users/drivers driving in respective vehicles along a common route.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A coordination server that retrieves and presents information based on location, the coordination server comprising:
    a mapping manager that maps a contact information into geo coordinates and when provided with the contact information responds back with a corresponding geo coordinates comprising latitude, longitude and elevation;
    a task coordinator that, when triggered by the mapping manager as it receives from a first mobile device the contact information, dynamically responds with a list of tasks and presents it to a first mobile device for completion by a user;
    the coordination server receives and processes, from the first mobile device, a corresponding user provided response and status information for the list of tasks;
    the coordination server presents alerts to the user of the first mobile device when it detects that the user has exited a location without completing one or more tasks from the list of tasks that have been assigned for completion at that location;
    wherein the list of tasks comprises a first set of tasks currently assigned to the user and a second set of tasks, if any, created by the user; and wherein coordination server also comprises at least one processor, memory and storage, wherein the at least one processor when instructed, or as required, executes the mapping manager and the task coordinator in order to provide their corresponding functionality.

2. The coordination server of claim 1 provides the list of tasks on a map presented to the first mobile device for visual inspection and task completion by a user, wherein each of a plurality of items in the list of tasks is represented by an icon on the map presented;
wherein, the coordination server, in response to selection of any of the plurality of items by the user, provides audio and textual instructions that aid in execution of the corresponding task, along with details of the corresponding task; and
wherein a route manager highlights the user's favorite restaurants, users preferred banks and user's preferred gas stations on the map along the route.

3. The coordination server of claim 2 wherein the first mobile device is a portable head-up display device that is mountable on the steering wheel of a vehicle as well as on the dashboard of a vehicle.

4. The coordination server of claim 3 that provides the list of tasks on a map presented to the first mobile device for visual inspection and completion by a user, wherein each of a plurality of items in the list of tasks is represented by an icon on the map presented;
the coordination server presents on the map, when requested by the user, local areas frequented by the user, businesses frequented by the user, businesses that frequently deliver food and supplies to the user regularly, time spent by the user of various local landmarks, and related statistical data;
the coordination server receives from the first mobile device requests for food, requests for drinks, requests for supplies provided by the user and communicates them to one or more local business along a current route;
the coordination server receives confirmation messages from the one or more local business in response to the requests for food, requests for drinks, requests for supplies and communicates it to the first mobile device; and
the coordination server facilitates navigation by the user to the one or more local business for pickup of corresponding food, drinks and supplies requested.

5. The coordination server of claim 1 wherein the contact information is one of an address, a phone number and a name, the coordination server further comprising:
an address to geo coordinates converter that, when provided with an address of a residence, building or office responds back with a latitude, longitude and elevation;
a phone number to geo coordinates converter that, when provided with a phone number associated with a residence, a building or an office responds back with the latitude, longitude and elevation; and
the mapping manager also maps the name of a business or residence into geo coordinates, and when provided with the name responds back with a corresponding geo coordinates comprising latitude, longitude and elevation.

6. The coordination server of claim 1 manages tasks, sends messages to the first mobile device and receives user selections from the first mobile device provided as user's voice commands and hand gestures; and
the task coordinator receives user specified new tasks from the first mobile device and stores them for subsequent distribution to the user, or subsequent retrieval by the user, based on a current location of the first mobile device.

7. The coordination server of claim 1 processes user voice commands received to locate places in proximity determined to be of interest to the user based on observed user habits and responds by providing geo coordinates and directions to those places in proximity; and
the coordination server sends detailed instructions that can be used by the first mobile device in guiding the first user to a user specified destination along with the list of tasks along that route to be completed by the first user enroute to the user specified destination, wherein the detailed instructions comprise textual directions, audio directions, maps, places to see and things to do at those locations, or a combination of these.

8. The coordination server of claim 1 prompts the user using the first mobile device to select one of plurality of restaurants along a current route;
the coordination server receives from the user an user order for purchasing an item for sale; and
the coordination server communicates the user order to the one of plurality of restaurants.

9. The coordination server of claim 1 determines that a user of the first mobile device has only partially completed a specific task A from the first set of tasks or the second set of tasks and reassigns the partially completed task A to a second user associated with a second mobile device; and
the coordination server, upon determining that the second user employing the second mobile device is also travelling along a current route taken by the first user employing the first mobile device, reassigns a subset of the list of tasks to the second mobile device for completion by the second user.

10. The coordination server of claim 1 receives a task training request for a specific task from the user of the first mobile device, communicates training material to first mobile device, and selectively conducts a charging transaction to charge the user a training fee;
wherein the training material comprises an interactive virtual reality video session that trains the user on executing the specific task.

11. The coordination server of claim 10 wherein the coordination server, when requested, provides a virtual tour video session to the first mobile device showing a turn by turn street level virtual reality video from the current location of the first mobile device to one or more destinations along a route formed by the locations associated with a dynamically determined second list of tasks.

12. The coordination server of claim 1 wherein the list of tasks, presented to the first mobile device for completion by the user, is dynamically determined based on the type of vehicle the user is currently employing for his commute or travel.

13. A mobile device for telematics and user interaction, the mobile device comprising:
a processor, memory, storage, and a global positioning system (GPS) receiver circuitry;
the mobile device configured to be mounted inside a vehicle, the mobile device also configured to interact with a coordination server;
a client software in the mobile device that communicates a contact information to the coordination server, receives a list of tasks provided by the coordination server and displays them to a user for completion by the user;

the client software in the mobile device displays locations where the individual tasks from the list of tasks are to be completed, on a map optionally displayed to the user;

the client software alerts the user of the mobile device when it detects that the user has exited a location among the locations without completing one or more tasks from the list of tasks that have been assigned for completion at that location;

the client software prompts and collects confirmation from the user that the individual tasks from the list of tasks were completed or not;

and the client software provides instructions that aid in execution of the one or more tasks by the user.

14. The mobile device of claim 13 further comprising:

the client software in the mobile device dynamically displaying a virtual reality video, when requested by the user, comprising street-level details along a dynamically computed route leading through the locations where individual tasks from list of tasks are expected to be completed; and the client software in the mobile device showing to the first user of the mobile device the execution of a task completed by a second user assigned to collaborate with him, wherein the second user employs a second mobile device communicatively coupled with the mobile device to conduct a similar or related task;

wherein the showing employs video streaming between the mobile device and the second mobile device.

15. The mobile device of claim 13 further comprising:

the client software receives from the user of the first mobile device requests for food, requests for drinks, requests for supplies and communicates them to one or more local business along a current route; and the client software receives and displays confirmation messages from the one or more local business in response to the requests for food, requests for drinks, requests for supplies and displays them on the mobile device.

16. A mobile device that is configured to interact with a server system the mobile device comprising:

a microphone configured to capture a first portion of input data;

a touch and gesture sensitive screen configured to capture a second portion of input data;

a first communication circuitry configured to connect with a communication means of the server system;

a processor configured to support a first operational mode and a second operational mode, the first operational mode involving, based on the first and second portions of the input data, retrieving a stored task list, and the second operational mode involving delivering at least a portion of the first and second portions of the input data to the server system and receiving from the server system a dynamically computed task list, wherein the processor is further configured to:

receive instructions that aid in completion of a first one of the tasks from the stored task list and or from the dynamically computed task list, wherein the first one of the tasks has been assigned for completion at a first location; and prompt a user to provide completion status for the first one of the tasks, upon determining the arrival at the first location; and alert the user of mobile device when it detects that the user has exited the first location without completing the first one of the tasks at the first location.

17. The mobile device of claim 16 wherein the processor is further configured to further:

monitor task assignment to the user and task completion by the user when located inside a vehicle used for travel by the user;

monitor the behavior of the vehicle, the behavior of a driver of the vehicle and report them to the coordination server;

track routes frequently taken by the user;

retrieve from the coordination server tasks dynamically assigned to the user that are to be conducted at locations along a changed route taken by the user;

and track incomplete ones of the dynamically assigned tasks.

18. The mobile device of claim 16 wherein the first operational mode involving both the first and second portions of the input data comprises:

in response to the input data, presenting previously saved route and highlighting the route on a map shown; and in response to the input data, selectively displaying user's preference of businesses, restaurants and gas stations on a map shown, and upon further user request providing navigation information to the user to user selected businesses, restaurants and gas stations.

19. The mobile device of claim 16 wherein the mobile device electronically records receipts, invoices, tokens and bills for products purchased, products delivered, services rendered and information collected as part of the execution by the user, of one of the tasks from the dynamically computed task list.

20. The mobile device of claim 16 wherein the mobile device provides supplementary information in audio, video or virtual reality format to the user for any of the tasks to be completed from the dynamically computed task list.

* * * * *